United States Patent [19]

Gruner

[11] 4,159,624
[45] Jul. 3, 1979

[54] CONTRA-ROTATING ROTORS WITH DIFFERENTIAL GEARING

[76] Inventor: George P. Gruner, 13 Bradley Rd., Andover, Mass. 01810

[21] Appl. No.: 875,046

[22] Filed: Feb. 6, 1978

[51] Int. Cl.² ............................................. F02C 7/02
[52] U.S. Cl. ................................. 60/39.16 C; 60/268
[58] Field of Search .................... 60/39.16 C, 39.16 S, 60/236, 268; 415/60, 65

[56] References Cited

U.S. PATENT DOCUMENTS

| | | | |
|---|---|---|---|
| 2,608,821 | 9/1952 | Hunsaker | 60/268 |
| 2,689,681 | 9/1954 | Sabatiuk | 60/39.16 C |
| 3,363,831 | 1/1968 | Garnier | 415/65 |
| 3,385,509 | 5/1968 | Garnier | 60/39.16 C |
| 3,524,318 | 8/1970 | Bauger et al. | 415/60 |

FOREIGN PATENT DOCUMENTS 1003514  2/1957  Fed. Rep. of Germany ...... 60/39.16 C Primary Examiner—Louis J. Casaregola
Attorney, Agent, or Firm—Pearson & Pearson

[57] ABSTRACT

A gas turbine power plant has a compressor stage and a turbine stage with an annular combustion stage therebetween. Each of the contra-rotatable compressor rotors is connected to one of the contra-rotatable turbine rotors by an elongated hollow cylindrical shaft concentric with an axially extending fixed shaft to form an integral unit. The units are operably connected by differential gearing mounted on the fixed shaft just in rear of the nose of the engine at the air intake end of the housing.

7 Claims, 2 Drawing Figures

CONTRA ROTATING ROTORS WITH DIFFERENTIAL GEARING

BACKGROUND OF THE INVENTION

It has heretofore been proposed to construct a gas turbine power plant wherein the axial flow compressor and the turbine include contra-rotating rotors as in U.S. Pat. No. 3,524,318 to Bauger of Aug. 18, 1970, or in U.S. Pat. No. 3,363,831 to Garnier of Jan. 16, 1968.

While the power plants disclosed in these patents include an outer rotor in place of the conventional fixed outer stator, the rotors revolving in opposite angular directions, the relative rotation has not been controlled and synchronized and there has been a need for a more simplified and efficient structure.

SUMMARY OF THE INVENTION

In this invention an elongated cylindrical casing includes a brace or rib at the open air intake end which supports a streamlined nose or predetermined diameter. A similar tail cone and supporting rib are provided at the gas discharge end of the casing. An axially extending shaft is fixed between the nose and the tail cone.

A pair of contra-rotatable rotor units are provided, there being a truncated, outer shell with inward projecting vanes, and a cylindrical, inner shell with outward projecting vanes in the compression stage of the housing.

The gas turbine stage is provided with at least two contra-rotatable turbine rotors, one in succession to the other and each connected to one of the compression rotors by one of a pair of coaxial, hollow cylindrical shafts concentric with the fixed shaft. Thus a pair of contra-rotatable compression turbine rotor units are formed, with the annular burner chamber encircling the hollow shafts connecting the compressor portions to the turbine portions.

Unlike the above mentioned patents, in this invention the contra-rotatable compressor, turbine units are operably connected to each other by differential gearing so that the driving force of the combustion chamber is always divided equally between the rotor units, with one unit, however, able to rotate at the same speed as the other but in the opposite angular direction.

The pinion shaft of the differential gearing is fast on the fixed shaft of the engine and the differential assembly is housed in a chamber formed within the shell of the inner rotor and located just in rear of the nose, of the engine.

DESCRIPTION OF A PREFERRED EMBODIMENT

Figure 1:
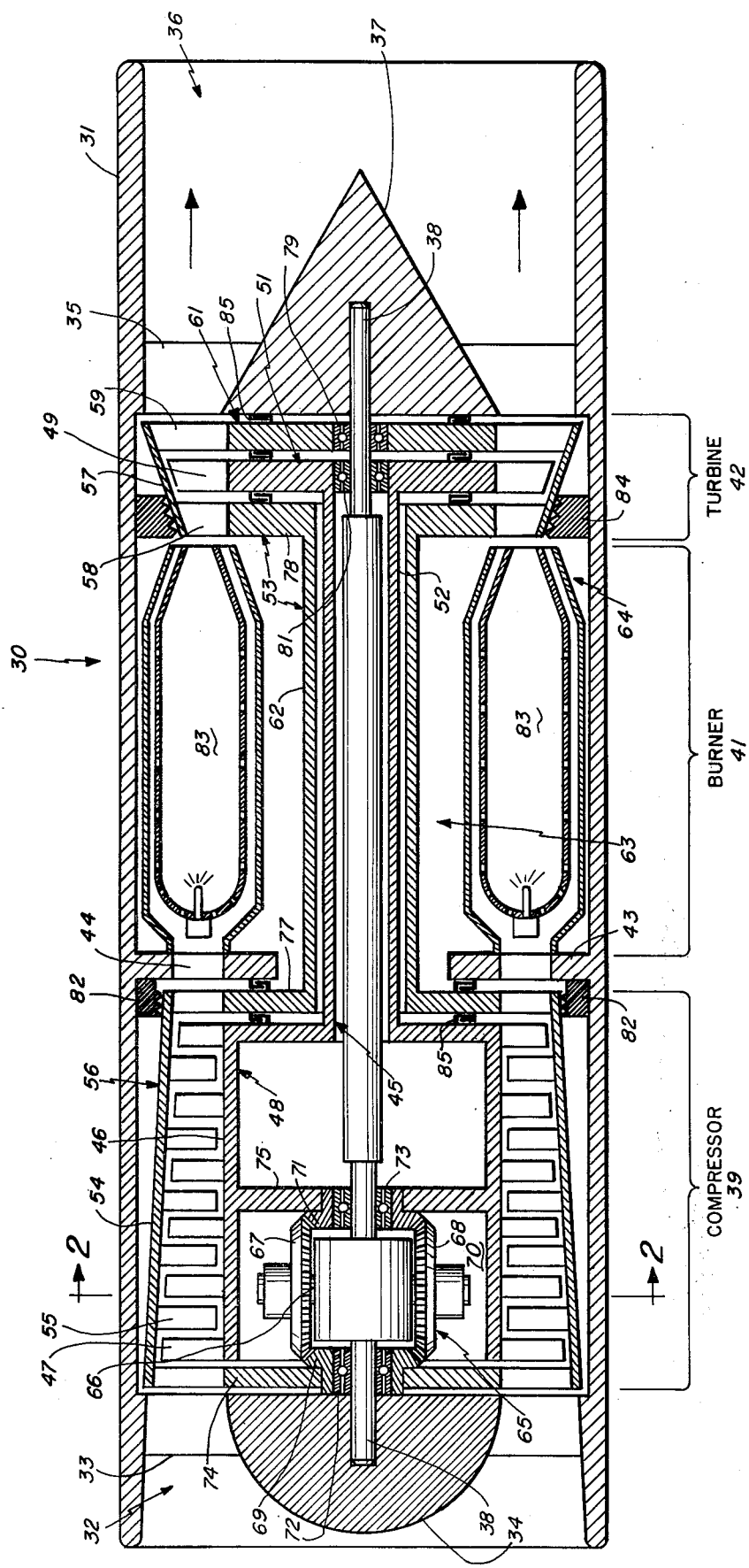
FIG. 1 is a schematic, axial half sectional side elevational view of a jet engine constructed in accordance with the invention.
Figure 2:
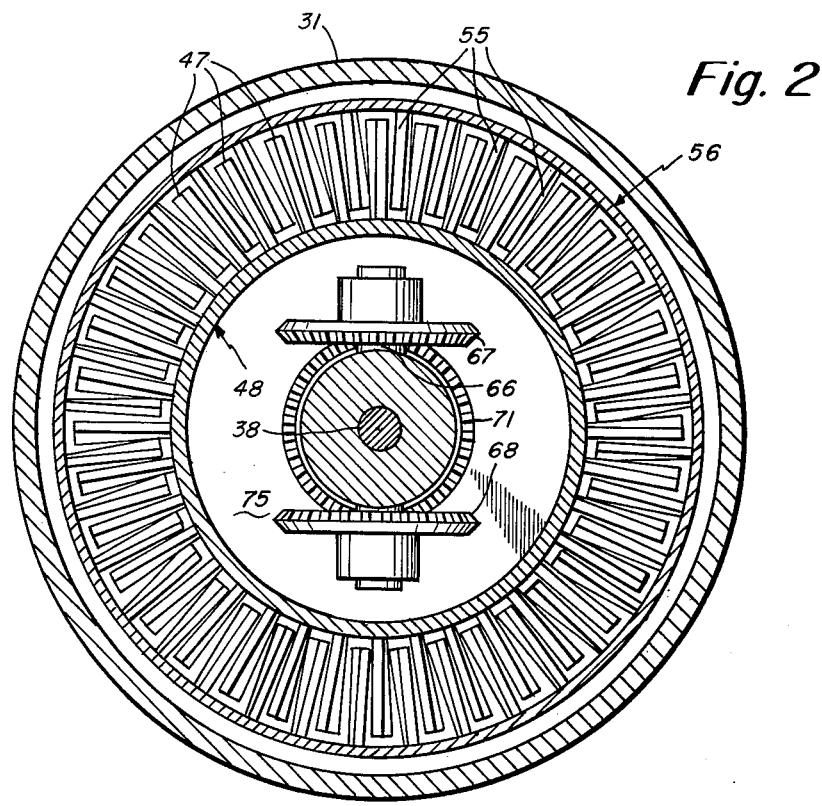
FIG. 2 is a transverse section on line 2—2 of FIG. 1.

The multi-stage, axial-flow, gas turbine power plant 30 of the invention includes an elongated outside casing 31, having an open, air intake end 32 with a brace 33 extending diametrically thereacross and supporting a streamlined nose 34 of predetermined diameter centrally thereof. A similar brace 35 extends diametrically across the open gas discharge end 36 of the casing and supports a streamlined tail piece 37 centrally thereof.

A shaft 38 extends axially of the casing 31 and is fixed against rotation in the nose 34 and in the tail piece 37.

The casing 31 is divided into a compressor stage 39 at the intake end, a centrally located burner stage 41 and a turbine stage 42 at the discharge end there being a fixed annular partition 43 between the compressor stage and burner stage which is provided with spaced ports 44 therearound.

An integral inner rotor unit 45 is provided consisting of the cylindrical shell 46, with axially spaced, outward projecting vanes 47 extending therearound to form one of the contra-rotatable compressor rotors 48 in the compressor stage 39. Inner rotor unit 45 also includes the outward projecting vanes 49 of the contra-rotatable rotor 51, in the turbine stage which drives the inner compressor rotor 48 by means of the integral, elongated hollow cylindrical tube 52 which is concentric with and extends axially along the fixed shaft 38.

An integral outer rotor unit 53 is provided which consists of the truncated conical shell 54, with axially spaced, inward projecting vanes 55 extending therearound to form the other contra-rotatable compressor rotor 56 in the compressor stage 39. Outer rotor unit also includes the truncated conical shell 57, having inward projecting vanes 58 and 59 which form the other contra-rotatable turbine rotor 61 in the turbine stage 42. The outer turbine rotor 61 drives the outer compressor rotor 56 by means of the integral elongated, hollow cylindrical tube 62, which is concentric with the fixed shaft 38 and with the tube 52 and which also extends axially between the turbine stage 42 and the compressor stage 39 in the inner portion 63 of the burner compartment 64.

The inward projecting vanes 47 and alternate outward projecting vanes 55 of the contra-rotatable compressor rotors 48 and 56 are interdigitated to rotate in the same plane but in opposite angular directions. Similarly the inward projecting vanes 58 and 59 and the alternate outward projecting vane 49 of the contra-rotatable turbine rotors 51 and 61 are interdigitated to rotate in the same plane but in opposite angular directions.

Differential gear means 65 is mounted just behind the nose 34, proximate the intake end 32 of the casing and includes the pinion gear shaft 66 fast on fixed shaft 38 and having a pair of pinion gears 67 and 68, each at an opposite end of the shaft. The pinion gears 67 and 68 are meshed with annular ring gears 69 and 71, each encircling the fixed shaft 38 and supported thereon by ball bearing 72 or 73. The outer rotor unit 53, includes the disco planate, annular element 74, of predetermined diameter equal to the diameter of the nose 34 which is fast on the ring gear 69 and the inner rotor unit 45 includes the annular, disco-planate element 75 fast on the ring gear 71 so that the driving force of the turbine is divided equally between the units and so that one unit may revolve at the same speed as the other but in the opposite angular direction.

The cylindrical shell 46 of the inner rotor unit is also equal in diameter to that of the nose 34 and forms a chamber 70 therewithin in which the differential gearing means 65 is housed.

The disco planate element 74 forms the large end of the truncated conical shell 54 of the outer compressor rotor 56, and the disco planate element 76 forms the large end of the truncated conical shell 57 of the turbine outer rotor. The small ends of the truncated conical shells 54 and 57 are designated 77 and 78 respectively.

Ball bearings 79 support the element 61 for rotation around shaft 38 and ball bearings 81 support the rotor 51 for contra-rotation around fixed shaft 38.

Suitable seals 82 are provided around the small end of shell 54 to confine the high compression produced in the compression stage and direct it into the ports 44 and thence into the burners 83. Similar seals 84 encircle the small end of the shell 57 and additional seals 85 are provided between the contra-rotating, adjacent surfaces of the disco plante portions of the rotor units.

I claim:

1. A gas turbine power plant of the type having an elongated casing with an air intake end, a gas discharge end, a centrally located burner chamber, a compression stage between the air intake end and the burner chamber, a turbine stage between the gas discharge end and the burner chamber, a fixed shaft extending axially of said casing from said intake end to said discharge end, said plant characterized by;

an inner vaned rotor mounted on bearings supported on said shaft for rotation therearound said rotor having outward projecting spaced vanes in said compression stage and in said turbine stage rotatable as a unit;

an outer vaned rotor mounted on bearings supported on said shaft for rotation therearound, said rotor having inward projecting spaced vanes in said compression stage and in said turbine stage rotatable as a unit;

the vanes of said inner rotor alternating with the vanes of said outer rotor and being interdigited therewith and differential gear means operably connecting said inner vaned rotor to said outer vaned rotor to rotate in mutually opposite angular directions around said fixed shaft.

2. A gas turbine power plant as specified in claim 1 wherein:

said casing includes at least one brace fixed diametrically across the intake end of said elongated housing, said brace supporting a streamlined nose centrally thereof; and said differential gear means is located on said fixed shaft proximate said intake end and in rear of said nose.

3. A gas turbine power plant as specified in claim 1 wherein:

said differential gear means includes a pinion gear shaft fast on said fixed shaft and having a pair of pinion gears each on each opposite end thereof;

and said outer vaned rotor and said inner vaned rotor, each include one of a pair of ring gears each encircling said fixed shaft and each meshed with one of the opposite sides of said pinion gears.

4. A gas turbine power plant as specified in claim 1 wherein:

said unitary, outer, vaned rotor comprises a truncated conical shell in said compression stage, having a large end at the air intake end of said housing and a truncated conical shell in said turbine stage having a large end at said gas discharge end; said shells each having their small ends connected to each other by an elongated cylindrical hollow tube concentric with, and encircling, said fixed shaft;

each large and small end of said shells comprising a central, annular, disco-planate member equal in diameter to the diameter of said nose and a plurality of vanes spaced therearound and supporting an opposite end of one of said shells.

5. A gas turbine power plant as specified in claim 1 wherein:

said turbine stage includes at least two successive vaned turbine rotors each rotating in an opposite angular direction;

said compressor stage includes at least two concentric vaned compressor rotors, each rotatable in opposite angular directions, one within the other;

one said turbine rotor driving one said compressor rotor in one direction and the other said turbine rotor driving the other said compressor rotor in the opposite direction.

6. A multi-stage, axial flow, power plant having an elongated causing containing a compressor stage with two contra-rotatable compressor rotors, at the intake end thereof, a gas turbine stage with two contra-rotatable rotors at the discharge end thereof and an annular burner chamber intermediate of said stages;

the vanes of said rotors being interdigitated;

each turbine rotor being connected to one of said compressor rotors by an integral cylindrical hollow tube extending axially of said housing inside of said annular burner chamber to form a pair of contra-rotating compressor turbine rotor units;

and differential gear means operably connecting one said unit to the other for dividing the driving force equally between them and permitting one unit to revolve at the same speed as the other but in the opposite angular direction.

7. A multi-stage, axial flow power plant as specified in claim 6 wherein:

one of the contra-rotatable compressor rotors in said compressor stage includes a truncated conical outer shell with spaced vanes projecting inwardly therefrom;

the other said contra-rotatable rotor in said compressor stage includes a cylindrical inner shell forming a cylindrical chamber therewithin; and said differential gear means is housed within said chamber.

* * * * *